UNITED STATES PATENT OFFICE.

ERNST BRUNO MIERISCH, OF MANAGUA, NICARAGUA.

PROCESS OF EXTRACTING GOLD AND SILVER FROM THEIR ORES.

SPECIFICATION forming part of Letters Patent No. 541,374, dated June 18, 1895.

Application filed July 18, 1894. Serial No. 517,913. (No specimens.) Patented in Germany December 2, 1892, No. 70,373.

*To all whom it may concern:*

Be it known that I, ERNST BRUNO MIERISCH, a citizen of the German Empire, residing in Managua, in the Republic of Nicaragua, have invented certain new and useful Improvements in Processes of Extracting Gold and Silver from Their Ores, (for which I have obtained Letters Patent in Germany, No. 70,373, dated December 2, 1892,) of which the following is a specification.

The process herein described relates to a modification of the well-known chlorination-process and has for its object the prevention of the injurious effects of the residues of the sulphur-arsenic and metallic oxides in oxidated and roasted ores by the hypochlorites and chlorates of the alkalies and alkaline earths, by mixing the ores with a calculated quantity of sodium hydrate and adding as much calcium hydrate as is necessary to separate the thus obtained sulfuric acid and arsenic acid in the form of insoluble calcium-salts, and to prevent thus the deterioration of the sodium chloride lye by sodium-sulphate. The separation of the sulfuric acid for instance takes place according to the following formula:

$$Na_2SO_4 + CaCl_2 + 2H_2O = (CaSO_4 + 2H_2O) + 2NaCl.$$

By the introduction of chlorine, sodium chloride (calcium chloride) is formed, as well as sodium hypochlorite and sodium chlorate (calcium hypochlorite and calcium chlorate) which bodies exert in the presence of chlorine an oxidizing action on the ores. The resulting metal-chlorides are leached by a concentrated solution of sodium chloride and the lye is mixed with sodium hydrate until alkaline reaction takes place. Of the more important metals that are hereby separated are: iron and copper in the form of hydroxides; while gold, silver, platinum, mercury, lead and zinc remain in solution. The precious metals and the lead are separated out from the alkaline solution by means of metallic zinc. Finally the remaining lye is subjected to the action of the electric current, whereby the zinc is first regenerated and next the chlorine and the sodium hydrate which substances are then used again in the process.

In carrying out my improved process, such vessels are used as have been found to be most practical in the extraction of gold by the chlorination process. The chlorine is obtained by the electrolytic decomposition of a hot concentrated solution of sodium chloride by which at the same time sodium hydrate and hydrogen are generated. The pulverized ores are mixed in the vessels or vats employed with sodium hydrate and slaked lime. Chlorine is then introduced, which forms with the alkalies and alkaline earths, chlorides and hypochlorites as well as chlorates in smaller quantity:

$$4NaOH + 4Cl = 2NaCl + 2ClONa + 2H_2O.$$
$$2Ca(OH)_2 + 4Cl = CaCl_2 + (ClO)_2Ca + 2H_2O.$$
$$6NaOH + 6Cl = 5NaCl + ClO_2ONa + 3H_2O.$$
$$6Ca(OH)_2 + 12Cl = 5CaCl_2 + (ClO_3)_2Ca + 6H_2O.$$

The action of the chlorine and oxygen compounds on the oxidizable substances is rendered clear by the following equations, in which for the sake of comparison the action of pure chlorine is illustrated by a separate equation:

$$2S + 12Cl + 8H_2O = 2H_2SO_4 + 12HCl.$$
$$2S + 2ClO_2ONa + 2H_2O = Na_2SO_4 + H_2SO_4 + 2HCl.$$
$$2S + 6ClONa + 2H_2O = 2Na_2SO_4 + 2NaCl + 4HCl.$$
$$3As_2O_3 + 12Cl + 6H_2O = 3As_2O_5 + 12HCl.$$
$$3As_2O_3 + 2ClO_2ONa = 3As_2O_5 + NaCl.$$
$$3As_2O_3 + 6ClONa = 3As_2O_5 + 6NaCl.$$
$$4Fe + 12Cl = 4FeCl_3.$$
$$4Fe + 2ClO_2ONa = 2Fe_2O_3 + 2NaCl.$$
$$4Fe + 6ClONa = 2Fe_2O_3 + 6NaCl.$$
$$3Cu_2O + 6Cl = 3CuCl_2 + 3CuO.$$
$$3Cu_2O + ClO_2ONa = 6CuO + NaCl.$$
$$3Cu_2O + 3ClONa = 6CuO + 3NaCl.$$
$$12FeS + 108Cl + 48H_2O = 4Fe_2S_3O_{12} + 4FeCl_3 + 96HCl.$$
$$12FeS + 18ClO_2ONa = 9Na_2SO_4 + Fe_2S_3O_{12} + 6FeCl_3 + 2Fe_2O_3.$$
$$12FeS + 54ClONa = 12Na_2SO_4 + 8FeCl_3 + 2Fe_2O_3 + 30NaCl.$$
$$4FeS_2 + 60Cl + 32H_2O = 2Fe_2S_3O_{12} + 2H_2SO_4 + 60HCl.$$
$$4FeS_2 + 10ClO_2ONa + 2H_2O = 5Na_2SO_4 + Fe_2S_3O_{12} + 2FeCl_3 + 4HCl.$$
$$4FeS_2 + 30ClONa + 2H_2O = 8Na_2SO_4 + 4FeCl_3 + 4HCl + 14NaCl.$$

The consumption of chlorine is consequently, from the above equations, neither more nor less than heretofore. By employing chlorates and hypochlorites for the oxidation, the formation of free acid is entirely obviated, unless the ores contain sulphur in the free state or in the form of pyrites, which however occurs but very seldom in well roasted ores; but even in presence of free sulphur, the quantity of generated acids is much less than when the oxidation is effected by pure chlorine. This obviates a great inconvenience in the process of chlorination heretofore in use, namely, the deterioration of the lye by the formation of large quantities of useless chlorides and the dissolving of otherwise insoluble substances, as gypsum, silicic acid, arsenate salts, &c. When the ore contains only oxides of metals, which are capable of a still higher oxidation, no chlorides whatever will be turned into solution when chlorates are employed for the oxidation, but the metals remain in the ore as oxides in insoluble form, as demonstrated in the equation given of the oxidation of $Cu_2O$. Only the precious metals, which occur always in metallic form or as silver, in the form of sulphates, are dissolved by the continuous action of chlorine. The lyes will therefore be very pure.

The chlorinated ore is mixed to a thin consistency with a concentrated lye of sodium-chloride to which the sodium-containing lye that is obtained by the electrolytic treatment of ordinary salt is added until an alkaline reaction takes place. The following substances are precipitated in the form of oxyhydrates: iron and copper entirely, most of the lead and zinc, and arsenic and antimony entirely in the form of the arsenate and antimoniate salts, according to the following equations:

$$2AsCl_5 + 3CaCl_2 + 16NaOH = As_2O_8Ca_3 + 16NaCl + 8H_2O.$$

$$AsCl_5 + FeCl_3 + 8NaOH = AsO_4Fe + 8NaCl + 4H_2O.$$

The alkaline sodium chloride lye contains gold, platinum, silver and mercury in solution, but zinc and lead can also be retained in the solution by adding sodium hydrate (NaOH) in excess.

The alkaline solution is next passed through granulated zinc, whereby gold, silver, platinum, mercury and lead are precipitated, while the zinc is dissolved. The zinc-containing lye is then directly subjected to the action of the electric current, whereby the zinc is regenerated in metallic form, while by the continued action of the electric current, chlorine and sodium lye are formed, which are returned for use in the process so that the cycle is closed thereby. The hydrogen gas which is formed at the same time may be used for illuminating purposes, for the soldering of lead plates, or for any other use in the laboratory for which illuminating gas is ordinarily used. The gold, silver, platinum and mercury precipitated by the zinc can be produced in metallic form by any one of the well-known methods in use.

The process herein described enables a very complete extraction of the precious metals by the process of chlorination and possesses the following advantages:

First. A great simplicity and easy supervision of the plant.

Second. The almost entire absence of chemicals, with the exception of slaked lime in case of ores containing sulphur and arsenic. Only the mechanical losses of sodium chloride have to be replaced, as no real chemical losses of chlorine or sodium hydrate can occur, as always an amount of sodium hydrate equivalent to the chlorine used is formed. However great the consumption of chlorine the decomposed sodium chloride is always recovered to the full extent. When the ores contain zinc-blende, it is not even necessary to replace the mechanical losses of zinc.

Third. As the electric current by which the reactions are produced, can be conducted from a distant point, it is possible to utilize a water-power which is situated at a considerable distance from the works.

Fourth. The very careful oxidizing roasting is not needed, as the chlorine only plays a subordinate or intermediate part in the process, the real agent being the electric current, so that for instance a small quantity of sulphur in the roasted ore would not mean a loss of chlorine, but a loss of electro-motive force, which is doubtlessly much cheaper than the equivalent quantity of chlorine, which is produced in the usual process of chlorination by the action of hydrochloric acid on manganese dioxide and which would represent a direct loss.

Having thus described my invention, I claim as new and desire to secure by Letters Patent—

1. The herein described process of extracting gold and silver from oxidated or roasted ores, which consists in subjecting the ores to the action of chlorates and hypochlorites while "*in statu nascendi*" by mixing the ground ores with sodium-hydrate, and then subjecting the mixture to the action of chlorine, substantially as set forth.

2. The herein described process of extracting gold and silver from oxidated or roasted ores, which consists in mixing the ground ores with sodium-hydrate, mixed with a corresponding quantity of calcium hydrate, then subjecting the mixture to the action of chlorine, whereby the ores are acted upon by chlorates and hypochlorites formed "*in statu nascendi*," and then leaching the lye with a concentrated sodium chloride solution, the deterioration of which is prevented by the addition of the calcium hydrate to the sodium hydrate, substantially as set forth.

3. The herein described process of extracting gold and silver from oxidated or roasted ores, which consists in mixing the ground ores with sodium hydrate, then subjecting the mixture to the action of chlorine until the ores are acted upon by the chlorates and hypochlorites formed "*in statu nascendi*," then leaching the lye with a concentrated solution of sodium chlorate and saturating the concentrated sodium-chlorate lye with sodium-hydrate in excess so as to separate the gold, silver, lead and zinc from the iron and copper, substantially as set forth.

In testimony that I claim the foregoing as my invention I have signed my name in presence of two subscribing witnesses.

ERNST BRUNO MIERISCH.

Witnesses:
ARTHUR RIPLO,
H. STRUSEIL.